Patented June 5, 1945

UNITED STATES PATENT OFFICE 2,377,814

2,377,814

PROCESS FOR THE MANUFACTURE OF PANTOTHENIC ACID AND THE SALTS THEREOF

Otto Schnider, Basel, Switzerland, assignor to Hoffmann-La Roche Inc., Nutley, N. J., a corporation of New Jersey No Drawing. Application July 14, 1943, Serial No. 494,725. In Switzerland July 17, 1942

2 Claims. (Cl. 260—531)

Pantothenic acid was found to be a biologically important substance. It may be manufactured by reacting $\alpha,\gamma$-dihydroxy-$\beta,\beta$-dimethyl-butyric acid or derivatives thereof, such as esters, lactone or acetylated acid chloride, with $\beta$-alanin or the salts or esters thereof.

According to the present invention, pantothenic acid or the salts thereof may be obtained by reacting $\alpha,\gamma$-dihydroxy-$\beta,\beta$-dimethyl-butyric acid-(3'-hydroxypropyl)-amide or $\alpha,\gamma$-diacetoxy-$\beta,\beta$-dimethyl-butyric acid-(3'-hydroxypropyl)-amide with oxidants. If the dextro-compound is chosen as the starting material, dextro-pantothenic acid, which is identical with the natural product, is obtained. Any oxidant apt to transform a primary alcohol into the corresponding carboxylic acid may be used for the execution of the invention. Salts of permanganic acid are especially suitable as oxidants. By the present process it is possible to oxidise the primary hydroxy group in the N-alkyl radical without affecting other parts of the molecule; this is all the more surprising since the unacetylated $\alpha,\gamma$-dihydroxy-$\beta,\beta$-dimethyl-butyric acid-(3'-hydroxypropyl)-amide also contains other oxidisable hydroxy groups.

Example 1

A solution of 205 parts by weight of dextro-$\alpha,\gamma$-dihydroxy-$\beta,\beta$-dimethyl-butyric acid-(3'-hydroxy-propyl)-amide is stirred into 2000 parts by weight of aqueous sulfuric acid at 15–20° C., the said aqueous sulfuric acid containing 120 parts by weight of concentrated sulfuric acid. A solution of 150 parts by weight of barium permanganate in 5000 parts of water is caused to flow into the acid solution during about 1 hour. The permanganate is used up immediately. The temperature is maintained between 15 and 20° C. by external cooling. After termination of the reaction, the solution is separated from the precipitate and completely freed from sulfuric acid with the aid of barium hydroxide solution. The aqueous solution of pantothenic acid is concentrated in vacuo at a maximum temperature of 35° C. to a volume of 1000 parts by weight and then stirred for 2 hours with 55 parts by weight of calcium carbonate at 25–30° C. While carbon dioxide evolves, the water-soluble calcium salt of pantothenic acid is formed. The filtered solution is evaporated to dryness in vacuo, whereupon the residue is dissolved in 200 parts by volume of absolute alcohol. The calcium salt is precipitated by adding acetic ester. For further purification, the calcium salt may be transformed into the cinchonidine salt by precipitating the calcium in aqueous solution with the calculated quantity of oxalic acid, concentrating the pantothenic acid in vacuo in order to free the same from water and adding to the methyl-alcoholic solution thereof the calculated quantity of cinchonidine base. The cinchonidine pantothenate obtained by concentration possesses upon recrystallisaton from methyl-ethyl ketone the properties described in the literature ("Berichte der Deutschen Chemischen Gesellschaft," vol. 74, year 1941, page 218), the melting point being at 178–179° C. $[\alpha]_D^{20°}=-69°$ for $c=1.2$ in water; melting point and optical activity are the same as in the cinchonidine salt prepared from pure pantothenic acid.

Alkali or alkali earth salts may be obtained from the cinchonidine salt by adding to the aqueous solution of the latter the calculated quantity of an alkali or alkaline earth, removing the cinchonidine with chloroform and boiling down the aqueous solution to dryness.

Example 2

289 parts by weight of dextro-$\alpha,\gamma$-diacetoxy-$\beta,\beta$-dimethyl-butyric acid-(3'-hydroxypropyl)-amide are dissolved in 2000 parts of water, a cooled mixture of 120 parts by weight of sulfuric acid in 500 parts of water is added while stirring and a solution of 150 parts by weight of barium permanganate in 5000 parts of water dribbled thereto at a temperature of between 15 and 20° C. After the permanganate has been completely used up, a 10 per cent solution of barium hydroxide is added at the same temperature while continuing the stirring until the mixture shows a permanent alkaline reaction to phenolphthalein.

The precipitate is separated by suction filtration. Barium ions are separated from the clear filtrate by means of dilute sulfuric acid added in exactly the quantity needed. The filtered solution is evaporated to dryness in vacuo. There remains a colorless pantothenic acid of sirupy form. It is taken up in 1000 parts of water and stirred with 55 parts by weight of calcium carbonate for 2 hours at 30° C. The foaming, which is rather considerable at the beginning, stops nearly completely after some time. The solution is filtered and evaporated to dryness in vacuo, whereupon the dry residue is dissolved in 300 parts by volume of absolute alcohol and filtered if necessary. Upon addition of dry acetic ester, the calcium salt of pantothenic acid precipitates. It is sucked off and dried. The cinchonidine salt prepared from the calcium salt possesses the same properties as those described in Example 1.

I claim:

1. Process for the manufacture of pantothenic acid and the salts thereof, comprising reacting a substance selected from the group consisting of dextro-$\alpha,\gamma$-dihydroxy- and dextro-$\alpha,\gamma$-diacetoxy-$\beta,\beta$-dimethyl-butyric acid-(3'-hydroxypropyl)-amide with a salt of permanganic acid.

2. The process of claim 1 in which the reagent salt is barium permanganate.

OTTO SCHNIDER.